United States Patent
He et al.

(10) Patent No.: US 9,745,829 B2
(45) Date of Patent: Aug. 29, 2017

(54) PRESSURE DIFFERENTIAL DEVICE

(71) Applicants: Zhi Y. He, Cypress, TX (US); Carlos P. Izaguirre, Dayton, TX (US)

(72) Inventors: Zhi Y. He, Cypress, TX (US); Carlos P. Izaguirre, Dayton, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 342 days.

(21) Appl. No.: 14/453,233

(22) Filed: Aug. 6, 2014

(65) Prior Publication Data

US 2016/0040503 A1   Feb. 11, 2016

(51) Int. Cl.

| | |
|---|---|
| *E21B 34/14* | (2006.01) |
| *E21B 34/10* | (2006.01) |
| *F16K 31/53* | (2006.01) |
| *F16K 31/54* | (2006.01) |
| *F16K 17/06* | (2006.01) |

(52) U.S. Cl.
CPC ............. *E21B 34/14* (2013.01); *E21B 34/10* (2013.01); *F16K 17/06* (2013.01); *F16K 31/53* (2013.01); *F16K 31/54* (2013.01)

(58) Field of Classification Search
CPC .......... E21B 34/14; E21B 34/10; E21B 23/08; E21B 34/08; E21B 34/16; E21B 43/123; F16K 31/53; F16K 31/54; F16K 17/06; F16K 17/0406; F16K 17/04
USPC ................................................ 137/529, 524
See application file for complete search history.

(56) References Cited

U.S. PATENT DOCUMENTS

| | | | | |
|---|---|---|---|---|
| 3,520,324 | A * | 7/1970 | Meregalli | F16K 1/12 137/219 |
| 4,009,756 | A * | 3/1977 | Zehren | E21B 34/10 137/522 |
| 4,067,358 | A * | 1/1978 | Streich | E21B 21/10 137/515 |
| 4,632,146 | A * | 12/1986 | Looney | F16K 17/0406 137/539.5 |
| 5,564,467 | A * | 10/1996 | Ackroyd | F16K 15/063 137/529 |
| 2007/0017217 | A1* | 1/2007 | Kouzu | F01N 3/206 60/289 |

* cited by examiner

*Primary Examiner* — Cathleen Hutchins
(74) *Attorney, Agent, or Firm* — Cantor Colburn LLP

(57) ABSTRACT

In one aspect, a pressure differential device including: an inlet; an outlet; and a fluid restricting member fluidly associated with the inlet and the outlet, wherein the fluid restricting member is configured to provide a first backpressure at a first setting and a second plurality of backpressures at a plurality of second settings. In another aspect, a method to control backpressure including: providing a fluid line with an inlet fluid flow; supplying the inlet fluid flow into a pressure differential device; expelling an outlet fluid flow out of the pressure differential device; pressurizing the inlet fluid flow to a first backpressure at a first setting of the pressure differential device; pressurizing the inlet fluid flow to a second plurality of backpressures at a plurality of second settings of the pressure differential device.

20 Claims, 3 Drawing Sheets

PRESSURE DIFFERENTIAL DEVICE

BACKGROUND

1. Field of the Disclosure

This disclosure relates generally to pressure differential devices that facilitate in situ backpressure adjustment and high pressure operation.

2. Background

Wellbores are drilled in subsurface formations for the production of hydrocarbons (oil and gas). Modern wells can extend to great well depths, often more than 15,000 ft. Accordingly, pressures in downhole locations can exceed 10,000 psi. During the course of production, the pressure in downhole locations diminishes over time. During production operations it is often desired to inject chemicals to downhole locations to prevent corrosion, remove debris, etc. During chemical injection operations, it is often desired to maintain a consistent backpressure for the chemical inlet flow, particularly at high wellbore pressures and as wellbore environmental conditions change.

The disclosure herein provides a pressure differential device that facilitates in situ adjustment of backpressure of an inlet flow and high pressure operation.

SUMMARY

In one aspect, a pressure differential device including: an inlet; an outlet; and a fluid restricting member fluidly associated with the inlet and the outlet, wherein the fluid restricting member is configured to provide a first backpressure at a first setting and a second plurality of backpressures at a plurality of second settings.

In another aspect, a method to control backpressure including: providing a fluid line with an inlet fluid flow; supplying the inlet fluid flow into a pressure differential device; expelling an outlet fluid flow out of the pressure differential device; pressurizing the inlet fluid flow to a first backpressure at a first setting of the pressure differential device; pressurizing the inlet fluid flow to a second plurality of backpressures at a plurality of second settings of the pressure differential device.

In another aspect, a production system including: a production tubing disposed in a wellbore; a chemical injection line fluidly associated with the production tubing; a fluid pump fluidly associated with the chemical injection line; at least one pressure differential device fluidly associated with the chemical injection line, the at least one pressure differential device including: an inlet; an outlet; and a fluid restricting member fluidly associated with the inlet and the outlet, wherein the fluid restricting member is configured to provide a first backpressure at a first setting and a second plurality of backpressures at a plurality of second settings.

Examples of the more important features of certain embodiments and methods have been summarized rather broadly in order that the detailed description thereof that follows may be better understood, and in order that the contributions to the art may be appreciated. There are, of course, additional features that will be described hereinafter and which will form the subject of the claims.

BRIEF DESCRIPTION OF THE DRAWINGS

For a detailed understanding of the apparatus and methods disclosed herein, reference should be made to the accompanying drawings and the detailed description thereof, wherein like elements are generally given same numerals and wherein:

FIG. 3 shows an elevation view of the pressure differential device shown in FIG. 2;

DETAILED DESCRIPTION OF THE DRAWINGS

Figure 1:
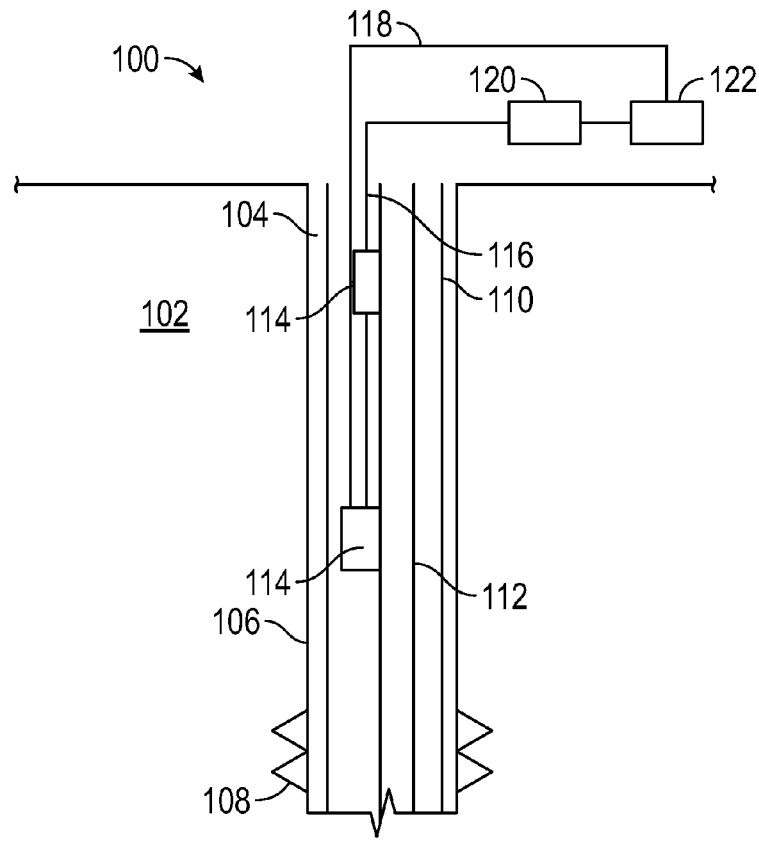
FIG. 1 shows an exemplary wellbore system that includes a pressure differential device, according to one non-limiting embodiment of the disclosure.

FIG. 1 is a line diagram of a completion system or completion assembly 100 for the production of formation fluids from a well. The assembly 100 is shown to include a casing 110 deployed in wellbore 104 formed in a formation 102. The formation 102 includes production zones, such as zone 108 at a downhole location 106.

The completion string 112 is disposed within casing 110. Chemicals utilized during production are supplied into completion string 112. In an exemplary embodiment, chemical pump 120 supplies chemicals to completion string 112 via chemical line 116. Such chemicals may include anti-corrosive chemicals, chemicals to remove debris, etc. Pressure differential device 114 is utilized to facilitate a backpressure within chemical line 116 and against pump 120. Controller 122 may control operation of pump 120 and further supply hydraulic pressure via control line 118 to pressure differential device 114. Hydraulic pressure via control line 118 may adjust the backpressure provided by differential device 114. In an exemplary embodiment multiple pressure differential devices 114 may be used in a wellbore to provide chemical injection at different depths with different backpressure requirements. A non-limiting embodiment of a pressure differential device 114 is described in reference to FIG. 2.

Figure 2:
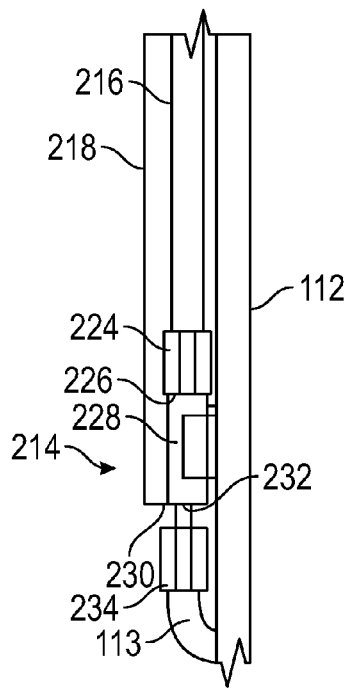
FIG. 2 shows a non-limiting embodiment of a pressure differential device for use in a wellbore system, including the wellbore system shown in FIG. 1, for deployment in a wellbore, such as wellbore shown in FIG. 1.

FIG. 2 shows a non-limiting embodiment of a pressure differential device for use in a wellbore system, including the wellbore system shown in FIG. 1, for deployment in a wellbore, such as wellbore shown in FIG. 1. The pressure differential device 214 includes an inlet 224 to receive flow from line 216, body 228, and an outlet 232 to supply chemical flow to completion string 112. In an exemplary embodiment, the pressure differential device 214 is associated with the completion string 112 via attachment points 113.

Inlet 226 receives chemical flow from flow line 216. Flow line 216 is attached to pressure differential device via line attachment 224. Flow line 216 may be attached via a threaded fit, interference fit, or any other suitable attachment. Body 228 contains the pressure differential mechanism described below. Outlet 232 supplies chemical flow to the completion string via outlet attachment 234. Similarly, outlet attachment 234 may be attached via a threaded fit, interference fit, or any other suitable attachment. Control line 218 is attached to pressure differential device 214 via hydraulic input 230. Hydraulic control via control line 218 allows for the backpressure supplied by pressure differential 214 to be adjusted remotely, and in situ without removing pressure differential device 214 from a downhole location.

Figure 3A:
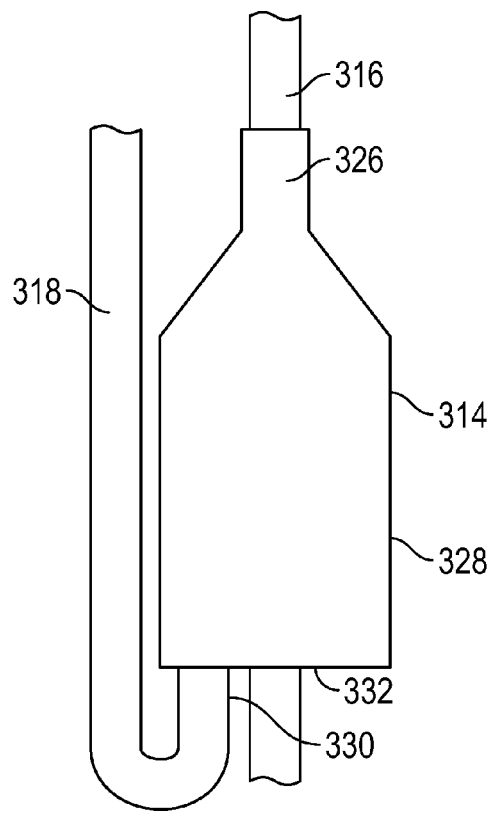
FIG. 3A shows another elevation view of the pressure differential device shown in FIG. 2.

FIGS. 3A-3D further illustrate a non-limiting embodiment of a pressure differential device as shown in FIG. 2. FIG. 3A shows pressure differential device 314 isolated from wellbore system 100 and without attachments 224 and 234.

Figure 3B:
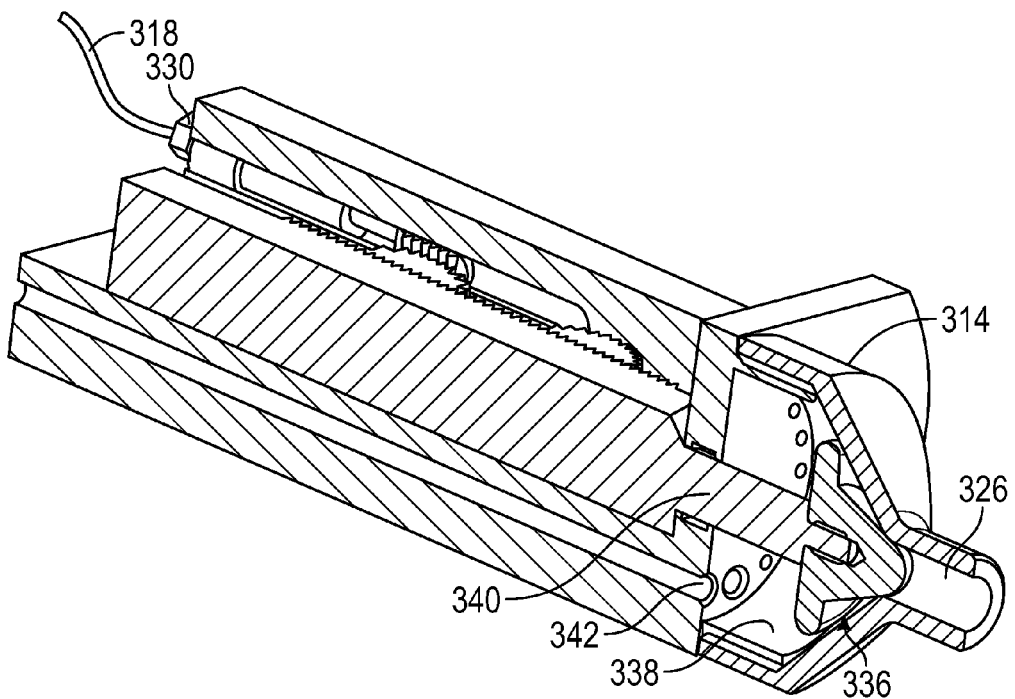
FIG. 3B shows a partial cross-section view of the pressure differential device shown in FIG. 2.

Referring now to FIG. 3B, a partial cross sectional view of pressure differential device 314 is shown. As flow is received by inlet 326, flow restrictor 336 imparts a flow restriction upon the incoming flow by interfacing with the inner profile of inlet 326. After passing beyond flow restrictor 336, flow reaches inlet chamber 338. Flow restrictor 336 may move within inlet chamber 338 longitudinally within pressure differential device 314 as the pressure differential is adjusted. Flow then proceeds through passage inlets 342 to be received by flow outlet (previously shown as outlet 232).

Figure 3C:
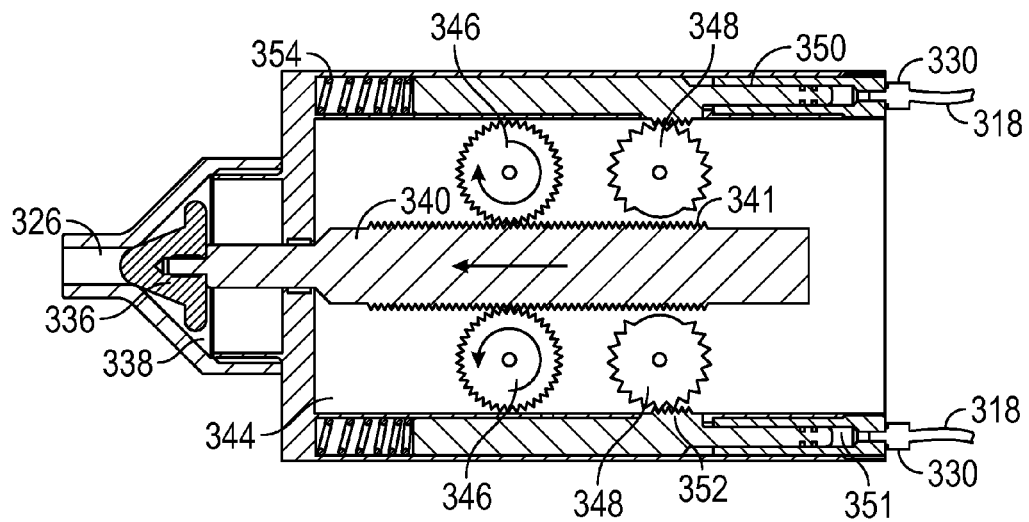
FIG. 3C shows a cross-section view of the pressure differential device shown in FIG. 2.
Figure 3D:
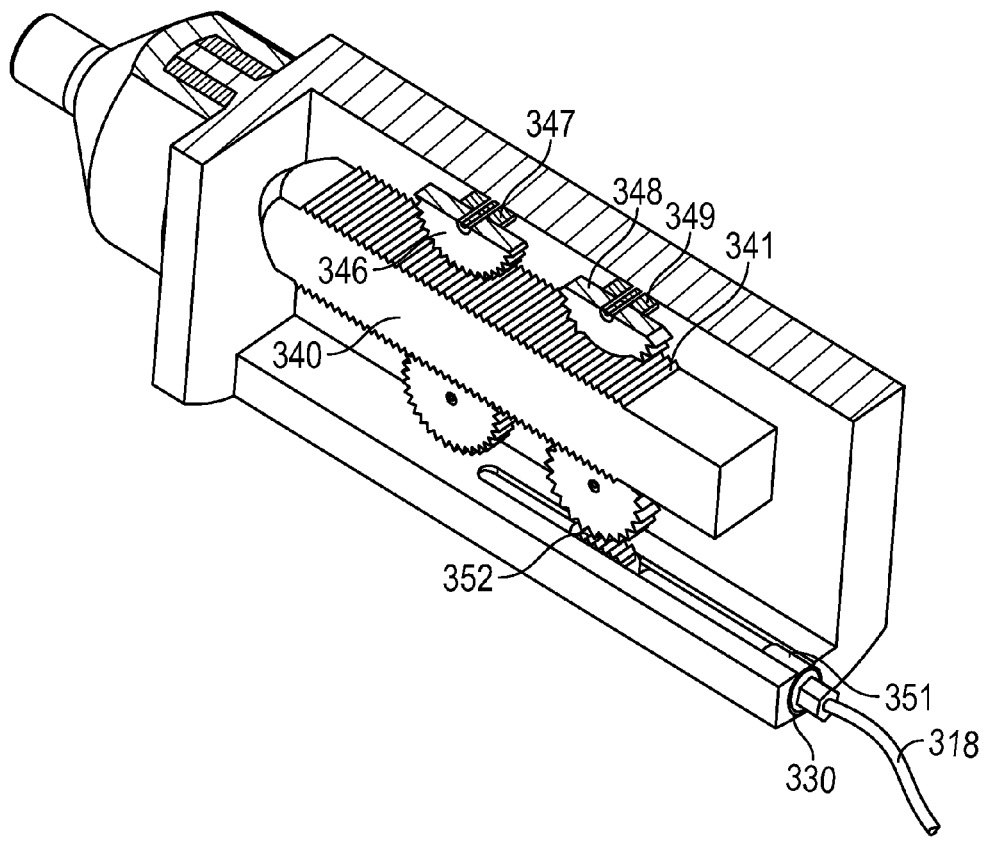
FIG. 3D shows another partial cross-section view of the pressure differential device shown in FIG. 2.

Referring now to FIGS. 3C-3D, the adjustment mechanism 344 of flow restrictor 336 is shown. Flow restrictor 336 works in conjunction with the inner profile of inlet 326 to limit flow and establish a desired pressure in inlet flow. Flow restrictor 336 is actuated within inlet chamber 338 by shaft 340. First gears 346 urge shaft 340 and ultimately flow restrictor 336 against an incoming flow and an inner profile of inlet 326.

First gears 346 mesh with the shaft teeth 341 of shaft 340. Referring to FIG. 3D, first gears 346 are rotationally urged by springs 347. While in an exemplary embodiment, springs 347 are torsional springs, springs 347 may be any suitable springs. Springs 347 in conjunction with first gears 346 generally urge the shaft 340 and flow restrictor 336 toward the inner profile on inlet 326. In an exemplary embodiment, first gears 346 and first springs 347 establish a first preload setting that determines the initial backpressure experienced by an inlet flow. The strength of springs 347 and the gear ratio of first gears 346 with respect to shaft teeth 341 may be adjusted to adjust the initial preload to meet desired backpressure characteristics with respect to wellbore environments, pump characteristics, fluid characteristics and other conditions.

Similarly, second gears 348 also selectively mesh with shaft teeth 341. In conjunction with second springs 349, and actuator 350, second gears 348 impart additional force upon shaft teeth 341, shaft 340, and ultimately flow restrictor 336 against inner profile 326 to further increase backpressure. Advantageously, a constant backpressure may be experience by supply line and pump to ensure consistent chemical injection and performance.

As shown in FIGS. 3C and 3D, in an exemplary embodiment second gears 348 are selectively engaged with shaft teeth 341. In an exemplary embodiment, second gears 348 have a portion without any teeth. Therefore, when second gears 348 are not engaged, shaft 340 is only urged by the force exerted by first gears 346. When additional force and backpressure is desired, hydraulic pressure may be utilized to increase backpressure.

Accordingly, actuator 350 and actuator teeth 352 must rotate second gears 348 a certain amount to engage second gears 348 with shaft teeth 341. As hydraulic pressure from hydraulic line 318 is adjusted, actuator 350 moves accordingly. In an exemplary embodiment, an increase in hydraulic pressure imparts a force on piston 351 to move actuator 350 toward the inlet end of pressure differential device 314 to engage second gears 348 with shaft teeth 341. In an alternative embodiment a release in hydraulic pressure allows a spring 354 to impart a force on actuator 350 to move actuator 350 toward an outlet end of pressure differential device 314 to similarly engage second gears 348 with shaft teeth 341. In certain embodiments, spring 354 and hydraulic pressure may work in conjunction to engage and disengage second gears 348 from shaft teeth 341.

Actuator teeth 352 rotate second gears 348 to engage with shaft teeth 341. After second gears 348 engage shaft teeth 341, second springs 349 may rotationally urge second gears 348. While in an exemplary embodiment second springs 349 are torsional springs, springs 349 may be any suitable springs. Springs 349 in conjunction with second gears 349 generally urge the shaft 340 and flow restrictor 336 toward the inner profile on inlet 326. In an exemplary embodiment, second gears 348 and second springs 349 establish a second setting that determines the secondary backpressure experienced by an inlet flow. The strength of springs 349 and the gear ratio of second gears 348 with respect to shaft teeth 341 may be adjusted to adjust the backpressure to meet desired backpressure characteristics with respect to wellbore environments, pump characteristics, fluid characteristics and other conditions.

After a hydraulic control operation, actuator teeth 352 may remain engaged with second gears 348. In other embodiments, actuator teeth 352 are disengaged from second gears 348. In certain embodiments, hydraulic pressure in addition to spring force, can further urge flow restrictor 336 into the inner profile of inlet 326 to increase backpressure or alternatively reduce backpressure by moving flow restrictor 336 in an opposite direction. Accordingly, hydraulic pressure from a controller or operator may provide settings in addition to the preload and second settings to increase and decrease the backpressure experienced. In an exemplary embodiment, a controller or operator may sense or observe backpressure experienced by a pump and adjust hydraulic pressure supplied to pressure differential device 314 to ensure consistent or desired back pressure, allowing for closed loop control.

Advantageously, the mechanical advantage provided by the springs and gear ratios allow a greater backpressure to be applied than conventional designs. Accordingly, the pressure differential device allows for the application of consistent backpressure even in high pressure, high depth wellbore environments. Further, the described pressure differential device is more compact compared to conventional designs, allowing for production flexibility and efficiency.

Therefore in one aspect, the present disclosure provides a pressure differential device including: an inlet; an outlet; and a fluid restricting member fluidly associated with the inlet and the outlet, wherein the fluid restricting member is configured to provide a first backpressure at a first setting and a second plurality of backpressures at a plurality of second settings. In certain embodiments, the fluid restricting member is coupled to a set of first springs configured to provide the first backpressure at the first setting. In certain embodiments, the fluid restricting member is coupled to a set of first gears rotationally urged by the set of first springs. In certain embodiments, the set of first springs are a set of first torsional springs. In certain embodiments, the fluid restricting member is coupled to a set of second springs configured to provide the second plurality of backpressures at the plurality of second settings. In certain embodiments, the fluid restricting member is coupled to a set of second gears urged by the set of second springs. In certain embodiments, the set of second springs are a set of second torsional springs. In certain embodiments, the first setting and the plurality of second settings is selected remotely. In certain embodiments, hydraulic line pressure selects the first setting and the plurality of second settings. The pressure differential device of claim 1, wherein the first setting and the plurality of second settings are selected to maintain a desired inlet pressure.

In another aspect, the present disclosure provides a method to control backpressure including: providing a fluid line with an inlet fluid flow; supplying the inlet fluid flow into a pressure differential device; expelling an outlet fluid flow out of the pressure differential device; pressurizing the inlet fluid flow to a first backpressure at a first setting of the pressure differential device; pressurizing the inlet fluid flow to a second plurality of backpressures at a plurality of second settings of the pressure differential device. In certain embodiments, further including providing the first backpressure via a fluid restricting member coupled to a set of first springs. In certain embodiments, further including urging a set of first gears via the set of first springs to provide the first back pressure via the fluid restricting member. In certain embodiments, further including providing the second plurality of backpressures via a fluid restricting member coupled to a set of second springs. In certain embodiments, further including urging a set of second gears via the set of second springs to provide the second plurality of backpressures via the fluid restricting member. In certain embodiments, further including selecting one of the first setting and the plurality of second settings remotely. In certain embodiments, wherein a hydraulic line pressure selects one of the first setting and the plurality of second settings remotely. In certain embodiments, further including selecting the first setting and the plurality of second settings to maintain a desired inlet pressure. In certain embodiments, further including selecting the first setting and the plurality of second settings in response to an environmental pressure change.

In another aspect, the present disclosure provides a production system including: a production tubing disposed in a wellbore; a chemical injection line fluidly associated with the production tubing; a fluid pump fluidly associated with the chemical injection line; at least one pressure differential device fluidly associated with the chemical injection line, the at least one pressure differential device including: an inlet; an outlet; and a fluid restricting member fluidly associated with the inlet and the outlet, wherein the fluid restricting member is configured to provide a first backpressure at a first setting and a second plurality of backpressures at a plurality of second settings.

The invention claimed is:

1. A pressure differential device comprising:
an inlet;
an outlet;
a fluid restricting member fluidly associated with the inlet and the outlet, wherein the fluid restricting member is configured to provide a first backpressure at a first setting and a second plurality of backpressures at a plurality of second settings;
a shaft coupled to the fluid restricting member, the shaft having a plurality of shaft teeth;
a first set of gears meshed with the plurality of shaft teeth, wherein the first set of gears correspond to the first setting; and
a second set of gears selectively meshed with the plurality of shaft teeth, wherein the second set of gears correspond to the plurality of second settings.

2. The pressure differential device of claim 1, wherein the fluid restricting member is coupled to a set of first springs configured to provide the first backpressure at the first setting.

3. The pressure differential device of claim 2, wherein the set of first gears is rotationally urged by the set of first springs.

4. The pressure differential device of claim 2, wherein the set of first springs are a set of first torsional springs.

5. The pressure differential device of claim 1, wherein the fluid restricting member is coupled to a set of second springs configured to provide the second plurality of backpressures at the plurality of second settings.

6. The pressure differential device of claim 5, wherein the set of second gears is rotationally urged by the set of second springs.

7. The pressure differential device of claim 5, wherein the set of second springs are a set of second torsional springs.

8. The pressure differential device of claim 1, wherein the plurality of second settings is selected remotely.

9. The pressure differential device of claim 8, wherein hydraulic line pressure selects the plurality of second settings.

10. The pressure differential device of claim 1, wherein the first setting and the plurality of second settings are selected to maintain a desired inlet pressure.

11. A method to control backpressure comprising:
providing a fluid line with an inlet fluid flow;
supplying the inlet fluid flow into a pressure differential device;
expelling an outlet fluid flow out of the pressure differential device;
pressurizing the inlet fluid flow to a first backpressure at a first setting of the pressure differential device, wherein the pressure differential device includes a shaft coupled to a fluid restricting member, the shaft having a plurality of shaft teeth, a first set of gears meshed with the plurality of shaft teeth, wherein the first set of gears correspond to the first setting and;
pressurizing the inlet fluid flow to a second plurality of backpressures at a plurality of second settings of the pressure differential device, wherein the pressure differential device includes a second set of gears selectively meshed with the plurality of shaft teeth, wherein the second set of gears correspond to the plurality of second settings.

12. The method of claim 11, further comprising providing the first backpressure via a fluid restricting member coupled to a set of first springs.

13. The method of claim 12, further comprising urging the set of first gears via the set of first springs to provide the first back pressure via the fluid restricting member.

14. The method of claim 11, further comprising providing the second plurality of backpressures via a fluid restricting member coupled to a set of second springs.

15. The method of claim 14, further comprising urging the set of second gears via the set of second springs to provide the second plurality of backpressures via the fluid restricting member.

16. The method of claim 11, further comprising selecting the plurality of second settings remotely.

17. The method of claim 16, wherein a hydraulic line pressure selects the plurality of second settings remotely.

18. The method of claim 11, further comprising selecting the first setting and the plurality of second settings to maintain a desired inlet pressure.

19. The method of claim 11, further comprising selecting the first setting and the plurality of second settings in response to an environmental pressure change.

20. A production system comprising:
a production tubing disposed in a wellbore;

a chemical injection line fluidly associated with the production tubing;
a fluid pump fluidly associated with the chemical injection line;
at least one pressure differential device fluidly associated with the chemical injection line, the at least one pressure differential device including:
an inlet;
an outlet;
a fluid restricting member fluidly associated with the inlet and the outlet, wherein the fluid restricting member is configured to provide a first backpressure at a first setting and a second plurality of backpressures at a plurality of second settings;
a shaft coupled to the fluid restricting member, the shaft having a plurality of shaft teeth;
a first set of gears meshed with the plurality of shaft teeth, wherein the first set of gears correspond to the first setting; and
a second set of gears selectively meshed with the plurality of shaft teeth, wherein the second set of gears correspond to the plurality of second settings.

\* \* \* \* \*